United States Patent

Taylor et al.

[11] Patent Number: 5,822,726
[45] Date of Patent: *Oct. 13, 1998

[54] SPEECH PRESENCE DETECTOR BASED ON SPARSE TIME-RANDOM SIGNAL SAMPLES

[75] Inventors: Matthew Whiting Taylor, Gurnee; Ralph Douglas Smallwood, Sleepy Hollow, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 381,675

[22] Filed: Jan. 31, 1995

[51] Int. Cl.$^6$ ........................................ G10L 9/18
[52] U.S. Cl. .................................. 704/233; 704/228
[58] Field of Search ........................... 395/2.19, 2.23, 395/2.24, 2.37, 2.42; 381/46; 704/210, 214, 215, 228, 233

[56] References Cited

U.S. PATENT DOCUMENTS

| | | | |
|---|---|---|---|
| 3,801,747 | 4/1974 | Queffelou et al. | 370/229 |
| 3,832,493 | 8/1974 | Clark | 704/230 |
| 4,028,496 | 6/1977 | LaMarche et al. | 704/233 |
| 4,281,218 | 7/1981 | Chuang et al. | 370/435 |
| 4,357,491 | 11/1982 | Daaboul | 704/233 |
| 4,365,112 | 12/1982 | Ruether et al. | 704/214 |
| 4,401,849 | 8/1983 | Ichikawa et al. | 704/210 |
| 4,410,763 | 10/1983 | Strawczynski et al. | 704/214 |
| 4,672,669 | 6/1987 | DesBlache et al. | 704/237 |
| 4,764,966 | 8/1988 | Einkauf et al. | 704/228 |
| 5,152,007 | 9/1992 | Uribe. | |
| 5,459,814 | 10/1995 | Gupta | 704/233 |

FOREIGN PATENT DOCUMENTS

| | | |
|---|---|---|
| 459363A1 | 12/1991 | European Pat. Off. . |
| 381068A1 | 10/1989 | Germany . |
| 68903872T | 6/1993 | Germany . |

OTHER PUBLICATIONS

Mischa Schwartz, William R. Bennett, and Seymour Stein, Communication Systems and Techniques, McGraw–Hill Book Company, pp. 3–4,46–50,82–83, 1966.

*Primary Examiner*—David R. Hudspeth
*Assistant Examiner*—Tālivaldis Ivars Šmits
*Attorney, Agent, or Firm*—Randall S. Vaas

[57] ABSTRACT

A speech presence detector (101) includes a circuit input (105) to couple to a source of input signals. A control signal generator (113) generates control signals. A sampling circuit (112) samples the input signals as a function of the control signal. A processor (116, 616, or 916) is coupled to the sampling circuit to receive the signal samples. The processor is responsive to the sampled signals to identify a background noise threshold and detect the presence of speech. According to one embodiment, the method and apparatus employ a random control signal. According to another embodiment, the average frequency of the control signal is below the Nyquist rate. According to another embodiment, the processor is responsive to the received signal to count the number of samples within a predetermined amplitude range and identifies a background noise threshold from the number of samples which are in the predetermined range.

19 Claims, 6 Drawing Sheets

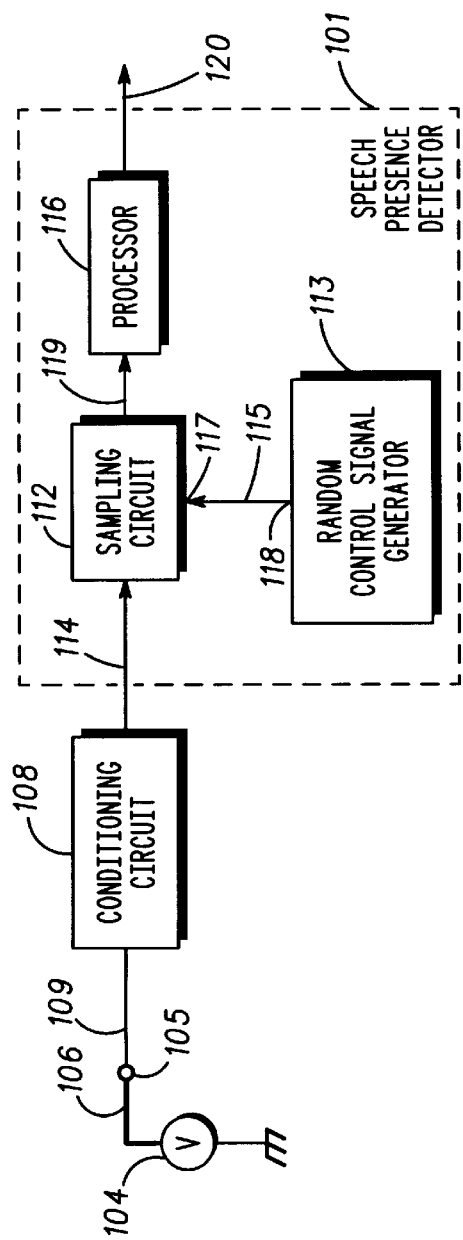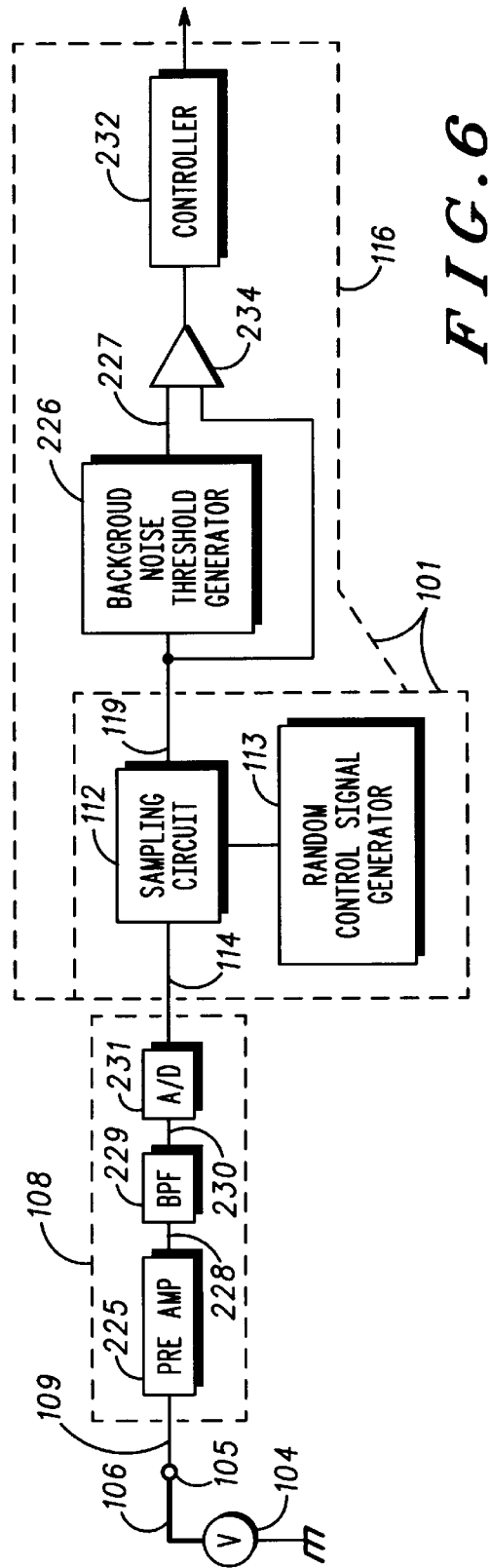

SPEECH PRESENCE DETECTOR BASED ON SPARSE TIME-RANDOM SIGNAL SAMPLES

FIELD OF THE INVENTION

The present invention pertains to speech presence detectors, and more particularly to identifying the beginning of speech.

BACKGROUND OF THE INVENTION

A variety of audio devices employ detectors that distinguish between speech and background noise to identify the beginning of a speech signal. These devices include: tape recorders; telephone equipment such as auto dialers, cellular telephones, cordless telephones and hands-free telephones; computer equipment; and numerous other devices. For example, tape recorders with voice-actuation automatically initiate recording when a voice signal is first detected. These recorders typically continue to run until speech is no longer detected. Hands-free telephone equipment includes transmit path circuitry, receive path circuitry and a controller which selects a transmit state enabling the transmit path circuitry or a receive state enabling the receive path circuitry. During hands-free operation, the controller transfers between the transmit and receive states depending upon the presence or absence of speech in the receive and transmit paths. Regardless of the device employing a circuit for detecting the start of speech, it is important that the speech presence detector reliably and rapidly detect the presence of speech once the user begins speaking.

Known circuits for detecting the presence of speech are implemented using analog and/or digital circuitry. Analog circuits for detecting the presence of speech include a long-time constant integrator and a short-time constant integrator. A comparator is connected to the output of the integrators. When the output level of the long-time constant integrator is less than the output level of the short-time constant integrator, the output of the comparator indicates that speech is present. When the output of the short time constant integrator is less than the output of the long time constant integrator, the output of the comparator indicates that speech is not present. A control circuit coupled to the output of the comparator detects the beginning of speech upon the transition of the output of comparator.

Digital speech presence detector circuits typically employ a digital signal processor to simulate the analog circuitry of the analog speech presence detectors. These digital circuits sample the input signal at a rate exceeding the Nyquist rate. As will be recognized by the those skilled in the art, the Nyquist rate is twice the highest frequency of the input signal of interest. A sampling rate which meets with the Nyquist rate for voice signals is at least 6000 Hz. The samples of the input signal taken at this high rate are filtered in an infinite impulse response (IIR) filter or a finite impulse response (FIR) filter. A comparison is made of the filtered signals to detect the presence of speech.

Although speech presence detectors utilizing analog or digital circuitry effectively identify the beginning of speech, it remains desirable to improve these detectors. The analog systems require analog op-amps, diodes, resistors, capacitors, and a comparator, which are external to any digital signal processor utilized therewith. These components are costly, requiring circuit board resources which it is desirable to eliminate so that the size and weight of the device employing the detector may be reduced. The digital systems employ a moderately fast analog-to-digital (A/D) converter, an external anti-aliasing filter, specialized hardware that performs thousands of multiplications every second, and critical timing, to effectively simulate the analog filters. These circuits require circuitry dedicated to speech presence detection because the digital signal processors utilized to perform other operations can not also implement the speech presence detector of prior art techniques, or an additional digital signal processor must be provided which is dedicated to speech presence detector operation. Alternatively, a more costly digital signal processor must be employed to perform all the circuit functions for the electronic device.

Accordingly, there is a need for a circuit which detects the presence of speech with a strong degree of confidence without using the analog circuitry of analog systems or the extensive digital circuit resources required by existing digital systems for detecting the presence of speech.

BRIEF DESCRIPTION OF THE DRAWINGS

FIG. 1 is a circuit schematic in block diagram form illustrating a circuit including a speech presence detector;

FIG. 6 is a circuit schematic in block diagram form illustrating an alternate embodiment of the speech presence detector according to FIG. 1;

DETAILED DESCRIPTION OF THE DRAWINGS

Figure 2:
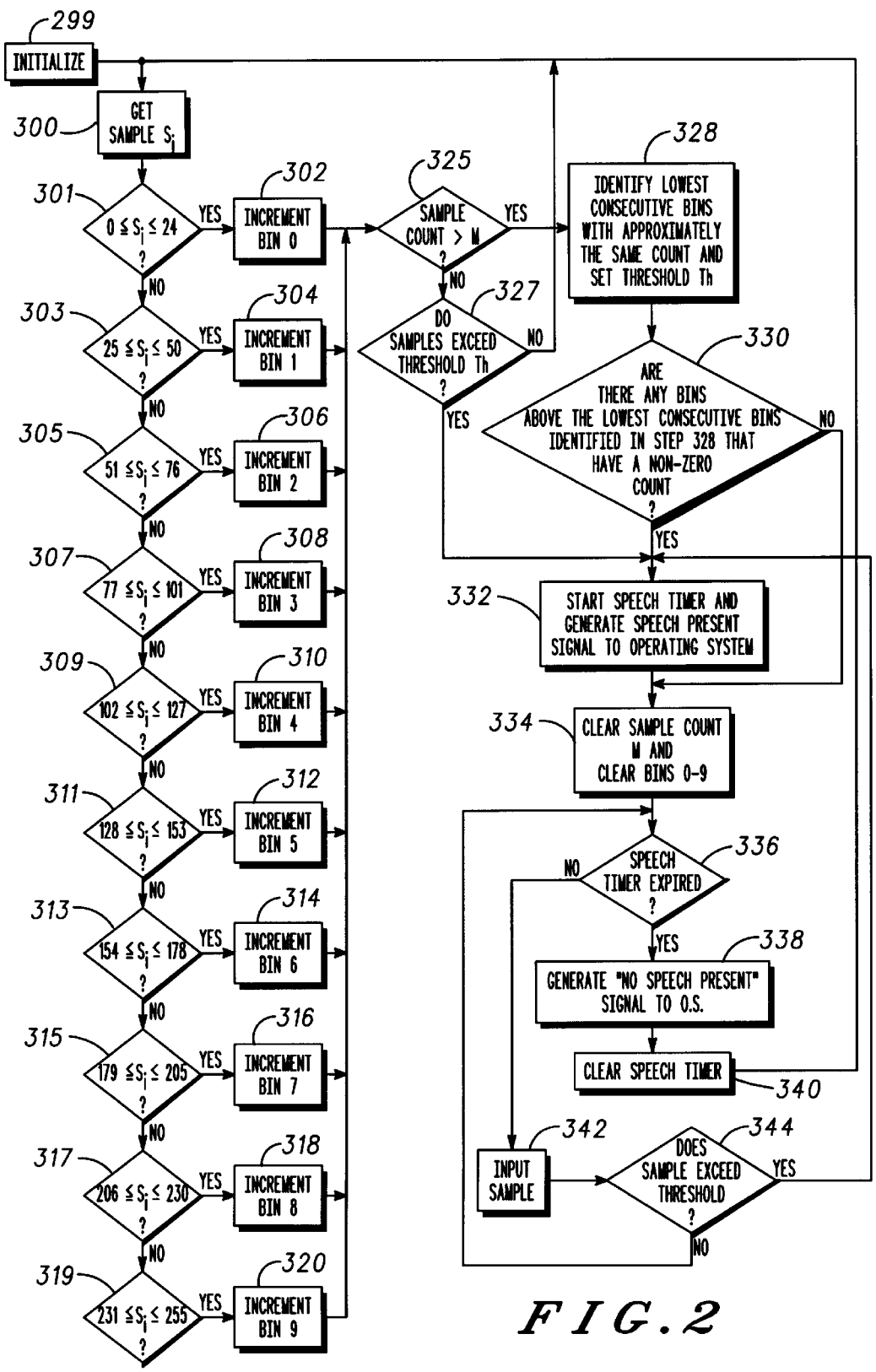
FIG. 2 is a flow chart illustrating operation of the processor in FIG. 1.

A audio circuit 103 including a speech presence detector 101 (FIG. 1) includes a circuit input 105 for coupling to a source of input signals 104. A control signal generator 113 generates control signals at a control output thereof. A sampling circuit 112 is coupled to the circuit input 105 and to the control signal generator 113. The sampling circuit samples the input signals as a function of the control signal. A processor 116 is coupled to the sampling circuit to receive the signal samples. The processor is responsive to the sampled signals to identify a background noise threshold and detect the presence of speech when the input signals exceed the background noise threshold. According to one embodiment, the control signal is a random signal. According to another embodiment, the average frequency of the control signal is below the Nyquist rate. According to one other embodiment, the processor is responsive to the received signal to count the number of samples within a predetermined range and identifies a background noise threshold from the number of samples which are in the predetermined range.

Audio circuit 103 includes a circuit input 105 coupled to a signal source 104. The source of input signals may be a microphone for converting audible signals to audio signals, a MODEM (i.e., a modulator/demodulator), a digital signal receiver, a hybrid (i.e., a two wire to four wire converter), or the like. The signal source output includes electrical signals representative of human speech, which may be referred to herein as human speech signals. The input signal source may thus include a telephone line, a demodulator, a transducer, or the like. The audio signals may include voice and/or data.

The output of signal source 104 (FIG. 1) is connected to circuit input 105 via a conductor 106. Circuit input 105 is connected to a conditioning circuit 108 via a second conductor 109. Conditioning circuit 108 includes circuitry which produces a signal having predetermined operating characteristics which are desirable for processing by other circuitry, such as speech presence detector 101. If the input signals are in an analog format, the conditioning circuit converters the input signal to a digital signal.

The output of the conditioning circuit 108 is connected to a sampling circuit 112 via a third conductor, or signal bus, 114. Sampling circuit 112 samples the conditioned signal output by the conditioning circuit 108 at a rate controlled by a control signal at control input 117. The control signal is communicated on conductor 115, which is connected between an output 118 of a control signal generator 113 and control input 117. Control signal generator 113 generates a random control signal. The control signal generator may be implemented using a commercially available signal processor or any other suitable signal generating circuit. The random control signals preferably have an average frequency that is below the Nyquist rate for voice signals, and most preferably have a frequency within the voice frequency range. The human voice frequency range is considered to extend from approximately 100–3500 Hz.

The control signal generator 113, produces a random control signal at output 118 as noted above. The control signal will either have random time intervals between pulses or the control signal generator will be randomly enabled to produce a control signal having a fixed frequency for random intervals. By allowing the controls signal generator to be randomly enabled, a processor primarily dedicated to other functions can perform speech presence detection during otherwise inactive periods. This eliminates the need for a dedicated speech presence detector processor or a costly microprocessor with the capability of multitasking. It will be recognized that processors go into an inactive state, or rest state, when predetermined conditions are met, which occurs at random intervals.

The output of sampling circuit 112 includes samples of the input signals and is connected to the input of a processor 116 via a forth conductor, or signal bus, 119. Processor 116 detects the presence of a speech signal from the random samples output by sampling circuit 112.

Those skilled in the art will recognize that the signals communicated on conductors 114 and 119 may be serial data on a single conductor or parallel data on a multi wire bus.

The operation of processor 116 will now be described with reference to FIG. 2. FIG. 2 illustrates speech presence detection for signals having eight bit words on conductors, or busses, 114 and 119 in FIG. 1. Upon initialization at block 299, a speech signal threshold Th is set to its maximum level, 255; a sample counter is cleared; bins 0–9 are cleared; and a speech timer is cleared. Processor 116 inputs an eight bit sample Si from the sampling circuit, as indicated in block 300. If the digital sample Si has a value of 0 to 24, as determined in decision block 301, a counter, referred to herein as bin 0, is incremented, as indicated at block 302. It should be noted that each of the bins is associated with a respective predetermined range, which is a subset of possible levels of the output of the conditioning circuit. The predetermined range associated with bin 0 is 0–24. If the digital sample has a value of 25 to 50, as determined in decision block 303, a counter referred to herein as bin 1, is incremented, as indicated at block 304. If the digital sample Si has a value of 51 to 76, as determined in decision block 305, the count in bin 2 is incremented, as indicated at block 306. If the sample Si has a value of 77 to 101, as determined in decision block 307, a count in bin 3 is incremented, as indicated at block 308. If the digital sample has a value of 102 to 127, as determined in decision block 309, a count in bin 4 is incremented, as indicated at block 310. If the digital signal sample has a value of 128 to 153, as determined in decision block 311, a counter referred to herein as bin 5 is incremented, as indicated at block 312. If the digital signal sample Si has a value of 154 to 178, as determined in decision block 313, a count in bin 6 is incremented, as indicated at block 314. If the digital signal sample has a value of 179 to 205, as determined in decision block 315, a count in bin 7 is incremented, as indicated at block 316. If the sample Si has a value of 206 to 230, as determined in decision block 317, a count in bin 8 is incremented, as indicated at block 318. If the digital signal sample Si has a value of 231 to 255, as determined in decision block 319, a count in bin 9, is incremented, as indicated at block 320.

After incrementing one of the bins 0–9, in one of blocks 302–320, the processor 116 determines whether a sample count has exceeded a predetermined number M, which for example is in the range of 100 to 200, as indicated in decision block 325. M is a predetermined number of samples to be used in setting speech signal threshold Th. If the sample count has not exceeded M, the microprocessor determines whether the sample Si exceeds a current speech signal threshold Th, as indicated in decision block 327. The current speech signal threshold Th is the background noise threshold. If digital sample Si does not exceed the threshold Th, the sample is background noise, and the processor inputs the next sample at block 300.

If it was determined in decision block 325 that the sample count exceeded M, the processor 116 proceeds to calculate the next threshold Th. The processor looks at the number of samples in each of bins 0–9. The processor 116 identifies consecutive bins that have substantially the same count as bin 0, as indicated in block 328. The threshold Th is selected to be the highest number in the highest bin having substantially the same count as bin 0. Thus, if each of bins 0–3 have substantially the same count, and bin 4 has a significantly lower count, then the threshold Th is set to 101, as 101 is the highest level in bin 4.

The processor 116 then determines whether the bins associated with levels above the threshold Th have a non-zero count, as indicated in decision block 330. If the threshold is 101 (i.e., the threshold is in bin 3), and one or more of bins 4–9 have a non-zero count, the processor will detect the beginning of speech at decision block 330. The processor will also detect the beginning of speech in decision block 327, if the sample Si exceeds the threshold Th set previously.

If the beginning of speech is detected in decision block 332 or block 327, the processor 116 starts a speech timer and generates a speech present signal output on conductor 120 (FIG. 1), as indicated in block 332. The speech present signal is utilized by the operating system employing the speech present detector.

If the beginning of speech is not detected in decision block 330, or following block 332, the processor 116 clears the sample count M, and clears bins 0–9, as indicated in block 334. This allows processor 116 to generate new bin counts for the next M samples following the return to block 300.

The processor 116 determines whether the speech timer has expired in decision block 336. The speech timer provides a hold over function, which may for example be a five second period. During the holdover period, the state of the speech presence detector will not change. This insures that the speech presence detector does not change state during short pauses in speech. If speech is detected during the holdover period, as determined in blocks 342 and 344, the processor returns to block 332, to reset the holdover timer. If the holdover period expires without detecting speech, the processor generates a "no speech present" signal for the operating system, as indicated in block 338. The processor then clears the speech timer at decision block 340, and returns to block 300 to input the next sample.

Thus it can be seen that the processor 116 uses a fixed number M of samples to generate the speech threshold level. because the control signals are generated at random, the time period represented by the threshold generated by processor 116 will vary randomly. Additionally, the maximum window within which samples are taken is limited by the fixed number of samples used. By restarting the threshold calculation without using the sample information form a previous threshold level calculation, the histogram changes quickly when background noise conditions change. Further, the complexity of the histogram is reduced by associating "bins" with more than one output level of the conditioning circuit 108.

Figure 3:
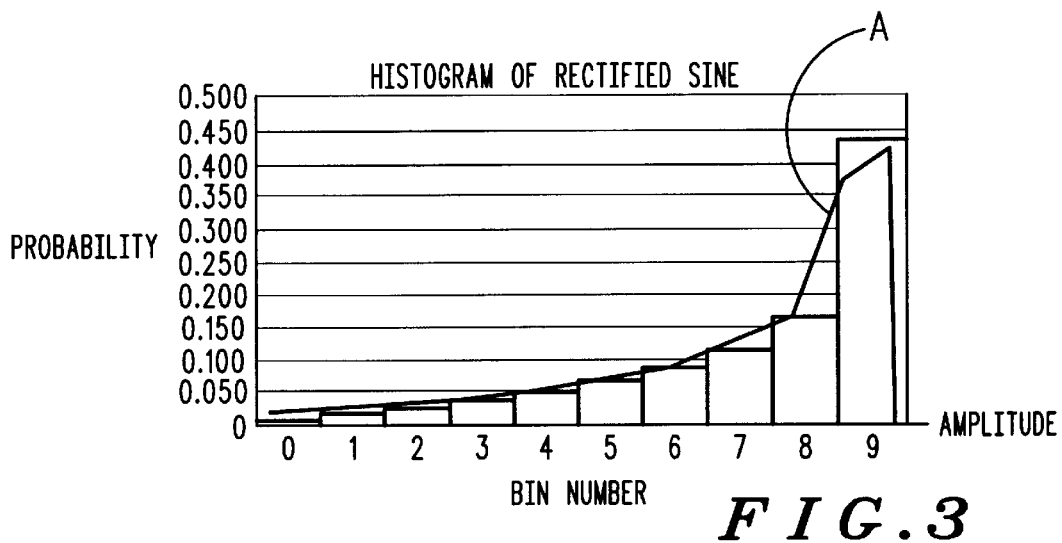
FIG. 3 is a probability distribution illustrating a histogram for a rectified sinusoidal input signal.

The operation of the speech presence detector will now be further described with reference to FIGS. 3 through 5. A histogram generated in processor 116, for a rectified sinusoidal signal at circuit input 105, is illustrated in FIG. 3. The sine wave is normalized to the range of the conditioning circuit 108 (FIG. 1) output, such that the peak of the sinusoidal wave is the highest level, 255 thereof. The illustrated histogram includes ten bins 0–9 associated with respective output levels of the eight bit output conditioning circuit 108. Each bin is represented by a rectangle in FIG. 3. The actual distribution of samples is represented by curve A in FIG. 3. As can be seen from FIG. 3, the count in bin 9, associated with highest amplitude samples is larger than the counts in bins 0–8, and the counts increase as the amplitude associated with the bins increases. Thus, the counts in bins 0–9 accurately represent the sine wave.

Figure 4:
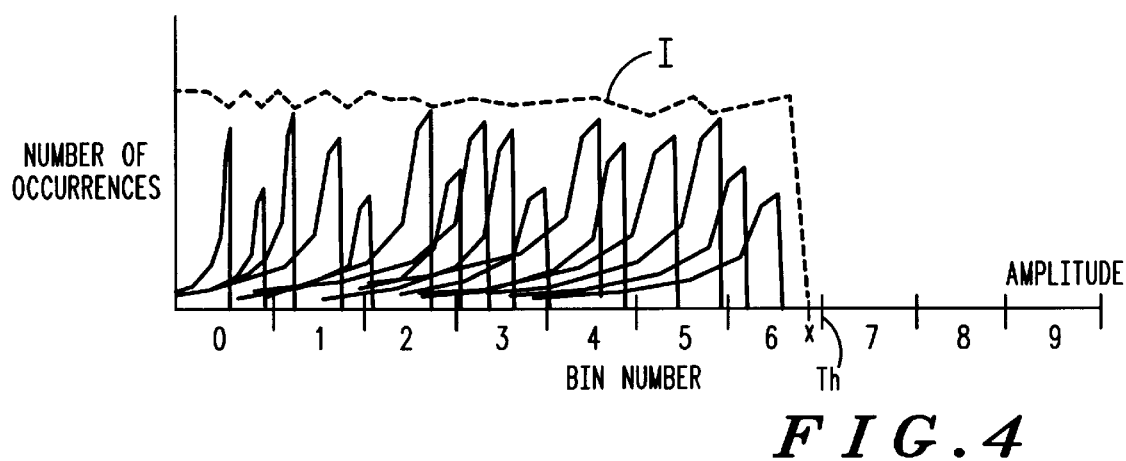
FIG. 4 illustrates a noise histogram as the number of occurrences on the vertical axis and amplitude on the horizontal axis.

The actual distribution of samples in a histogram for random background noise is illustrated in FIG. 4. Because truly random background noise is a summation of a plurality of sinusoidal signals for different frequencies, the background noise histogram is a summation of the sine wave distributions for all those frequencies. As can be seen in FIG. 4, the histogram of random noise approaches a rectangular distribution (shown in dotted lines), since background signals at different frequencies have different amplitudes, and the histograms for signals at different frequencies overlap. As the randomness of the signals, and the number of samples, increases, the histogram will become rectangular.

Applicants have found that the histogram is independent of frequency in a truly randomly sampled system. Applicants have also found that increasing or decreasing the amplitude of the background noise results in a left or right shifting of the histogram, respectively (i.e., "x" shifts right and left as the amplitude of the background noise increases and decreases, respectively). Applicants have further found that using bins to count samples over respective ranges of amplitudes, will cause the histogram to become more rectangular.

Background noise and speech can be identified from the histogram. Thus, the dashed, generally rectangular line I over those amplitudes having the greater number of samples, represents the background noise. Signals exceeding the threshold x set by the box will be speech signals. FIG. 5 shows the effect of a speech signal on the background noise. The speech signal causes the rightward shift of the samples. This rightward shift is shown in box J, which represents speech signals of a higher amplitude than the background noise signals. Applicants have found that the number of samples having the higher amplitudes associated with speech (i.e., amplitude above the threshold x) is typically smaller than the number of samples having amplitudes of less than x (background noise). The threshold x may thus be held throughout speech.

Figure 5:
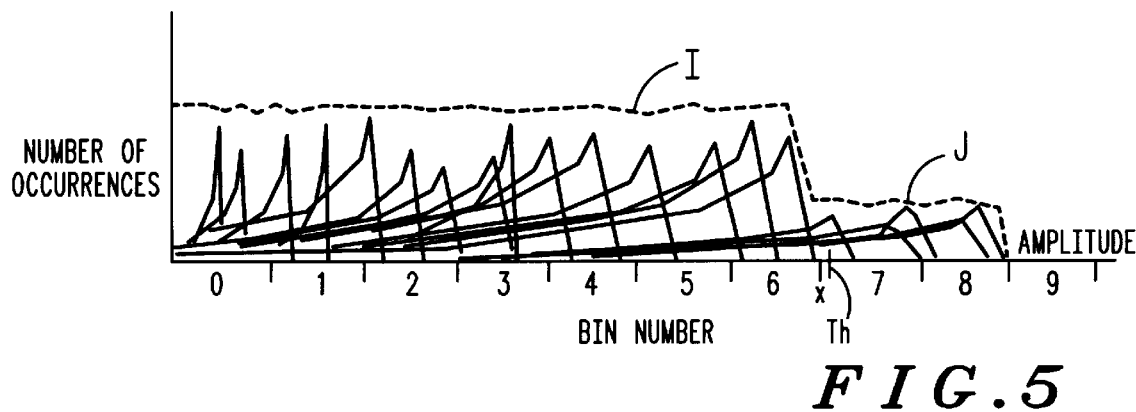
FIG. 5 illustrates a histogram of noise and speech signals with the number of occurrences on the vertical axis and amplitude on the horizontal axis.

In the example illustrated in FIGS. 4 and 5, the threshold x falls within bin 6. The threshold Th is selected to be the highest amplitude associated with bin 6, and thus the speech threshold Th employed by the speech presence detector in the embodiment illustrated in FIG. 2 is slightly greater than the actual threshold x.

An alternate embodiment is illustrated in FIG. 6. The embodiment of FIG. 6 shows an analog conditioning circuit 108 including a preamplifier 225 for amplifying the electrical signal output by signal source 104. A bandpass filter (BPF) 229 is connected to the output of the preamplifier 225 via a conductor 228. The BPF removes noise signals which are outside the voice frequency range. An A/D converter 231 is coupled to the output of the BPF via a conductor 230. The A/D converter produces digital representations of the amplified and filtered representations of the input signals. A digital conditioning circuit would include conventional digital signal conditioning components, such as rectifiers, demodulators, filters or the like, which components are not shown.

The processor 116 includes a background noise threshold generator 226 (FIG. 6), a comparator 234, and a controller 232. The background noise threshold generator 226 produces a threshold signal which represents the speech threshold level. The comparator 234 has a first input connected to the background noise threshold generator via a conductor 227. The other input of the comparator is connected to conductor 119. The output of the comparator 234 is coupled to the controller 232, which may be implemented using any suitable, conventional signal processor.

The background noise threshold generator 226 (FIG. 6) produces background noise threshold Th. The threshold generator performs steps 300–320, 325, 328 and 334 in FIG. 2 to generate this threshold. The threshold level is continuously applied to the comparator 234. The controller 232 performs blocks 332, 336, 342, 344, 338, and 340 of FIG. 2 to provide a holdover function.

In operation, the comparator 234 (FIG. 6) compares the threshold signal output by the background noise threshold generator to the sampled signal, and outputs a comparison result to the controller. When the sampled signal is greater than the threshold signal, the output of the controller has a high logic level, identifying the presence of speech. When the instantaneous signal is less than threshold signal, the comparator outputs a low level signal indicating the absence of a speech signal.

Figure 7:
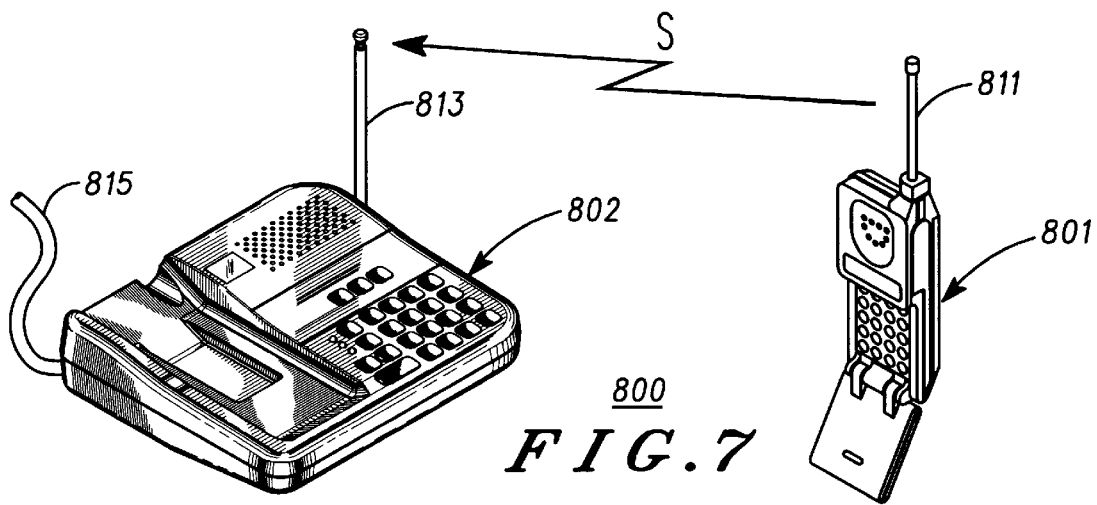
FIG. 7 is a noise histogram with the number of occurrences on the vertical axis and the bin number on the horizontal axis for a twenty sample generalization.

Referring now to FIG. 7, a cordless telephone 800 is illustrated which includes a handset 801 and a base 802. Radio frequency (RF) signals, represented by arrow S, are communicated between handset 801 and base 802 via antennas 811 and 813. Base 802 is connected to a landline telephone network (not shown) via cable 815. Although a cordless telephone is illustrated, the invention may also be employed by a mobile or portable cellular telephone, or the like. Accordingly, "radio telephone" as used herein includes all such telephones and their equivalents. The present invention may also be utilized in other electronic equipment, such as computers, personal communicators, hard wired telephones, and two way radios, or the like.

Figure 8:
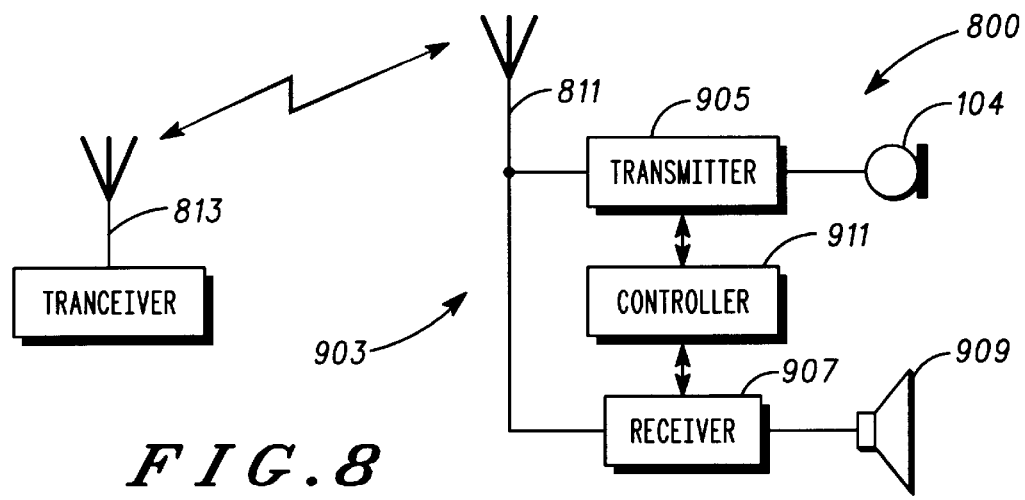
FIG. 8 is noise histogram for a noisier background level than that illustrated in FIG. 7 and shown as the number of occurrences on the vertical axis and the bin on the horizontal axis for a twenty sample generalization.

The handset 801 (FIG. 7) of cordless telephone 800 includes an audio circuit 903 (FIG. 8). The illustrated signal source 104 is a microphone that is connected to an RF transmitter 905. The microphone may be any suitable commercially available audio transducer. The transmitter is in turn connected to antenna 811.

An RF receiver 907 is connected between antenna 811 and a speaker 909. A controller 911 is connected to the transmitter and receiver. The controller may be implemented using any suitable microprocessor, such as the integrated circuit number HC-11 microprocessor available from Motorola.

Figure 9:
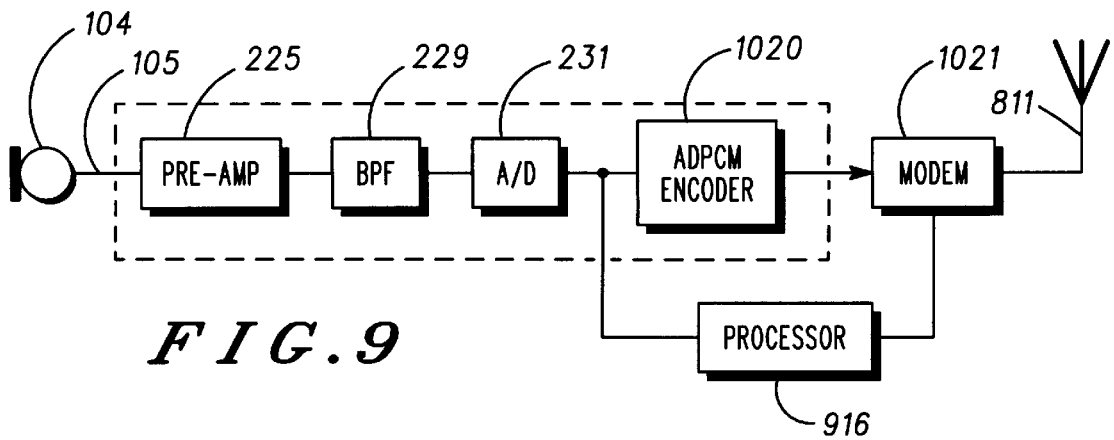
FIG. 9 is perspective view illustrating a cordless telephone in which the present invention may be employed.

The transmitter 905 (FIG. 9) includes a circuit input 105 connected to preamplifier 225. The output of preamplifier 225 is connected to BPF 229. BPF 229 removes signals outside the voice frequency range, passing signals between approximately 200 and 3000 Hz. The output of the band pass filter is connected to an A/D converter 231. The A/D converter 231 operates at a conventional signal frequency rate for A/D speech signal conversion. The output of the A/D converter is connected to an adaptive differential pulse code modulated (ADPCM) converter 1020. The ADPCM generates a pulse code modulated output signal which is input to downstream circuits, such as a modulator/demodulator (MODEM) 1021 of the handset 801. The MODEM transmits the signal output from the ADPCM to transceiver circuitry in base 802. The preamplifier, band pass filter, A/D converter, and ADPCM are comprised in a standard interface, such as the MC145540 integrated circuit commercially available from Motorola Corporation.

A processor 916 is connected to the output of the sampling circuit to detect the beginning of speech. The processor performs the speech detection operations as described below. The main controller for the radio telephone handset may be implemented using any suitable commercially available signal processor, such as the HC-11 available from Motorola Inc.

According to one advantageous implementation of the invention, the radio telephone 200 includes an HC-11 microprocessor to perform telephone operations. This microprocessor enters a "rest", or "wait", state whenever it is not implementing other control functions. During this rest state, which occurs randomly, the processor samples the output of the A/D converter to detect the background noise threshold. The average sampling rate is reduced since samples are taken for generating the noise threshold only during the wait state, during which the processor is performing no other operations. The speech presence detector can thus be implemented using circuitry employed for other operations, and operates in the background. This avoids a requirement for separate dedicated circuitry for speech presence detection. In a reduction to practice, the average frequency of the control signal was less than 1000 Hz, and good speech signal detection times were achieved, detecting the beginning of speech from the rest state.

The operation of the telephone 800 (FIGS. 7 and 8) is such that a power amplifier (not shown) in the transmitter 905 is enabled when speech is present and disabled thereafter. In this manner, the power amplifier does not (train current when speech signals are not present at the microphone and the power amplifier is enabled during speech to transmit signals via antenna 811. The controller 911 is coupled to the transmitter to enable the transmitter to output signals to the antenna when the presence of speech is first detected. The amplifier is powered during the holdover period and turned off thereafter. The transmitter is thus disabled from outputting signals to the antenna a predetermined time after speech is no longer present in the digital representations output by the A/D converter.

Figure 10:
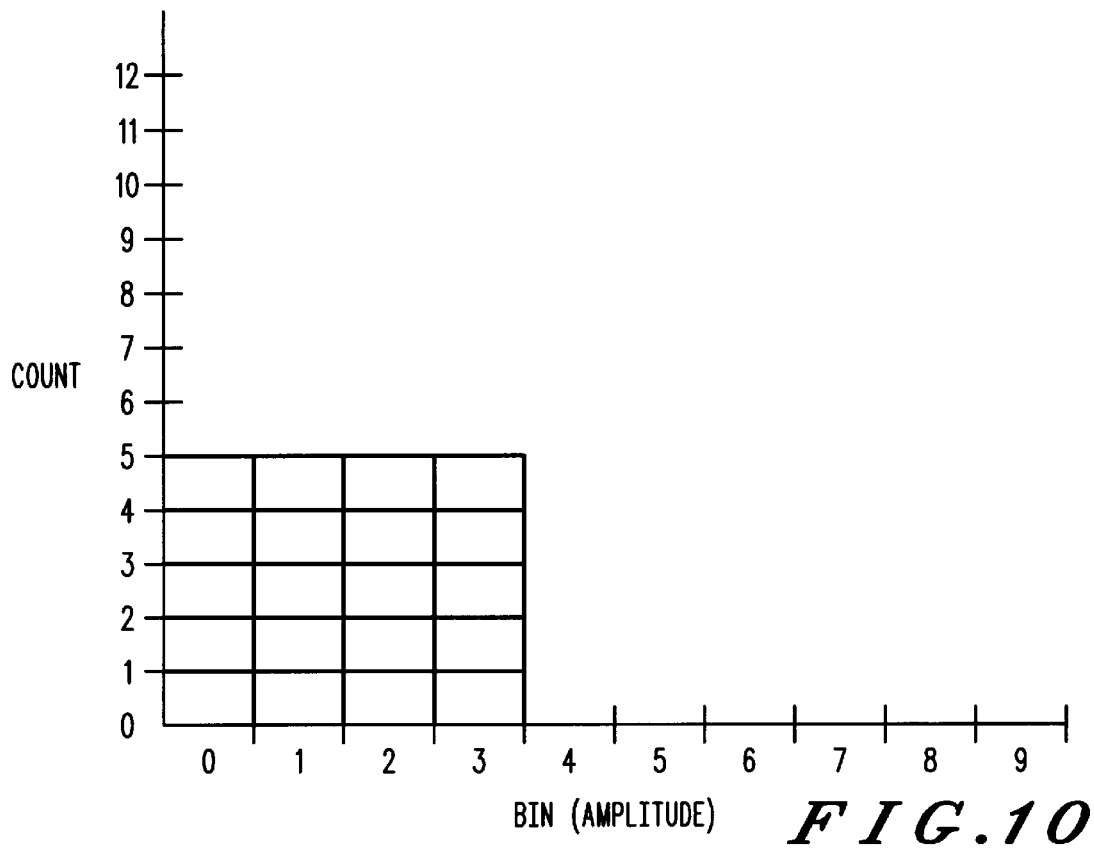
FIG. 10 is a circuit schematic in block diagram form illustrating an audio circuit for the cordless telephone according to FIG. 9.
Figure 11:
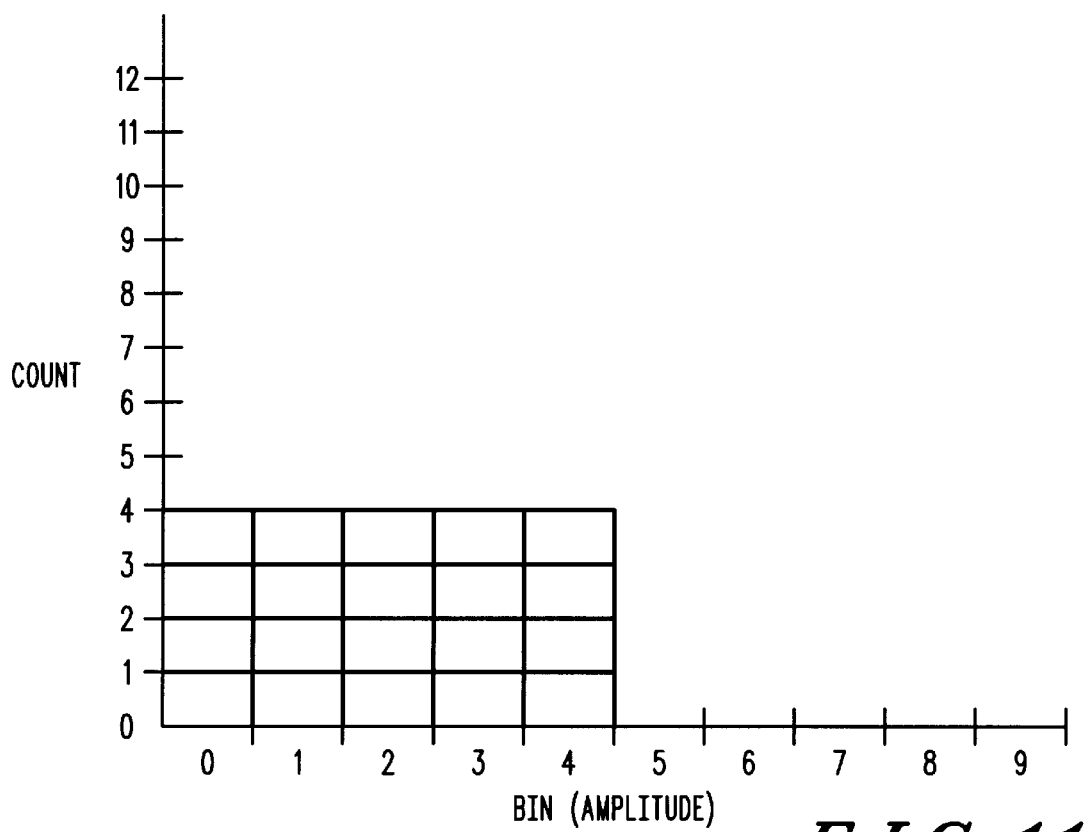
FIG. 11 is a circuit schematic in block diagram form illustrating a transmitter circuit including a speech presence detector for the telephone according to FIG. 10.

Applicants have further discovered that the first bin (the "zeroth" bin) may be advantageously employed to set the threshold level. An example of how the threshold is set using bin 0 will be described with reference to FIGS. 10 and 11. FIG. 10 represents a twenty sample distribution when all twenty samples are in bins 0–3. The background noise threshold is set at the amplitude level associated with the lowest signal level of bin 3. Thus an input signal sample having an amplitude level associated with bins 4–9 will result in a speech present signal being generated. If the background noise has a higher level, the twenty samples will appear in the count of bins 0–4. Thus, the threshold is the highest level associated with bin 4. If the input signal sample has a level associated with bins 5–9, the processor 916 outputs a signal indicating the presence of speech.

If processor 916 uses 128 samples, and employs ten bins, the relationship of the zeroth bin count to the background noise threshold is as follows. If the bin 0 count is greater than or equal to 65, then the maximum level associated with background noise is in bin 0, and the speech threshold Th is 24. If the count in bin 0 is greater than or equal to 43, and less than 65, then the maximum value associated with background noise is in bin 1, and the speech threshold Th is 50. If the count in bin 0 is greater than or equal to 33, and less than 43, then the maximum value associated with background noise is in bin 2, and the speech threshold Th is 76. If the count in bin 0 is greater than, or equal to 26, and less than 32, then the maximum value associated with background noise is in bin 3, and the speech threshold Th is 101. If the count in bin 0 is greater than, or equal to 22, and less than 27, then the maximum value associated with background noise is in bin 4, and the speech threshold Th is 127. If the count in bin 0 is 19, 20 or 21, then the maximum value associated with background noise is in bin 5, and the speech threshold Th is 153. If the count in bin 0 is 17 or 18, then the maximum value associated with background noise is in bin 6, and the speech threshold Th is 205. If the count in bin 0 is 15 or 16, then the maximum value associated with background noise is in bin 7, and the speech threshold Th is 205. If the count in bin 0 is 13 or 14, then the background noise threshold is in bin 8, and the speech threshold is 230.

In this manner, the zeroth bin can be used to set the speech threshold, and the remaining bins do not have to be tracked. This use of the zeroth bin significantly reduces the complexity of the background noise threshold generator, since the relationship between bin count zero and the background noise threshold can be stored in a look up table provided by a memory wherein the bin count is used as an address and the thresholds are stored at a memory location associated with the addresses. This is accomplished using a ROM where the count in bin 0 is the address of the ROM and data output by the ROM is the threshold Th.

Shown below is the pseudo code for the speech presence detector subroutine using the zeroth bin to calculate the speech threshold. The subroutine may, for example, reside inside a radio telephone's Sleep Task routine. The Sleep Task is one of several tasks in a cooperative multitasking system for the HC-11 microprocessor implemented processor (116, 616, or 916) of a cellular telephone, and is typically executed at the lowest priority level. That is, it only executes a sleep task when all of the other tasks have no processing pending.

---

Pseudo Code

```
LABEL Initialize:
    sample_count=0
    threshold=0
LABEL Loop:
    Get sample_value from A/D converter
    Increment sample_count
    if sample_value falls inside histogram bin 0
        then increment bin_0 count
    end if statement
    if sample_value exceeds threshold
        then signal OS that voice is present
    end if statement
    if sample_count>128
        then
            update bin_0 average
            load new threshold from table based on bin_0
                average
            clear sample_count
            divide bin_0 count by 2
            if sample_value has not exceeded threshold for
                decay period then signal OS that voice is
                absent
        end if statement
end if statement
go to LABEL Loop
```

---

Figure 12:
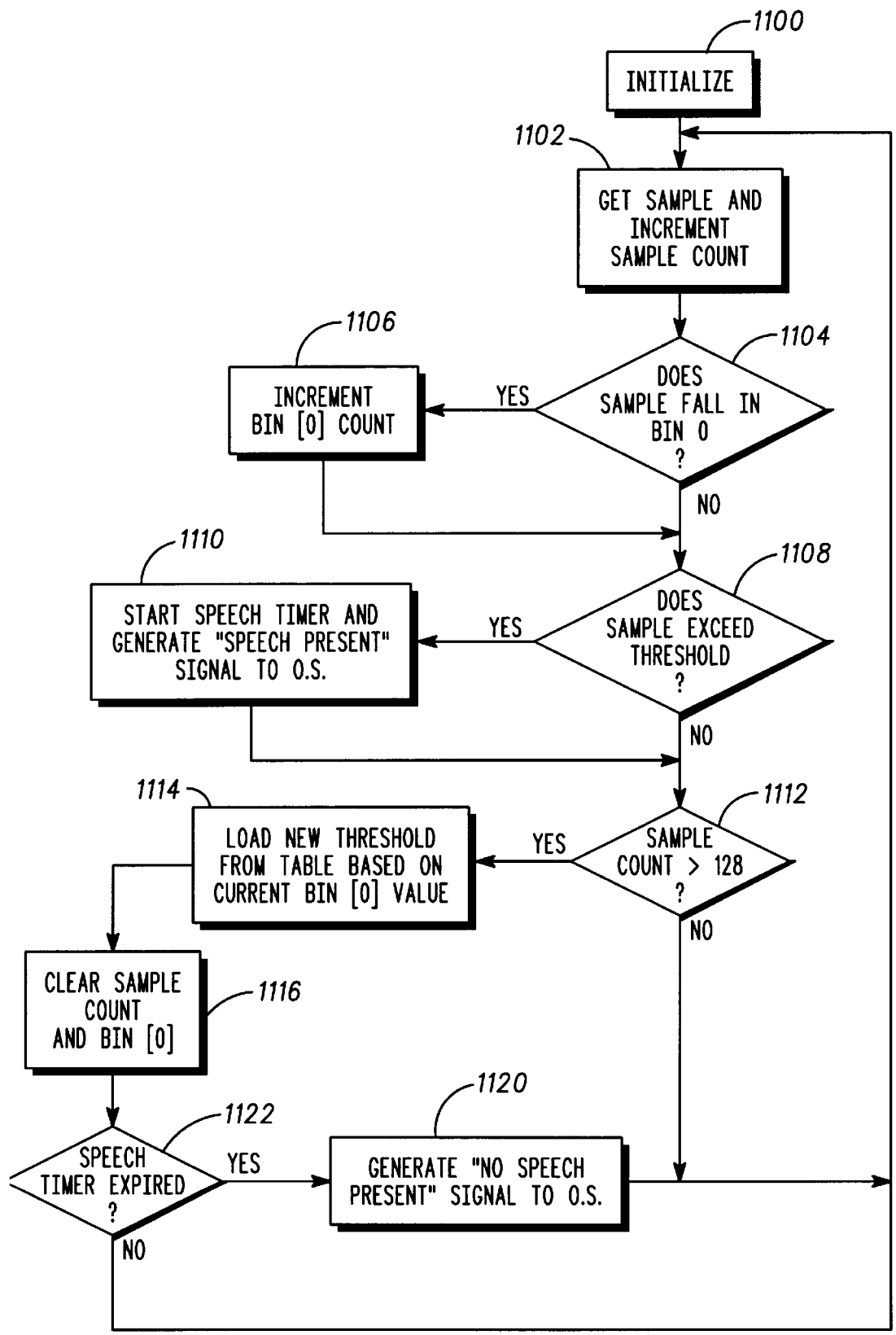
FIG. 12 is a flow chart illustrating an alternate operation of the processor.

The operation of a processor 916 performing the above pseudo code will now be described with reference to FIG. 12. The processor 916 (FIG. 9) enters the speech detection subroutine in the wait state for the device. The processor is initialized at block 1100. In this block, a sample count is cleared and a speech holdover timer is cleared. The processor then inputs a sample output by the A/D converter 231, as indicated in block 1102 (FIG. 12). If the input signal is a digital signal, the conditioning circuit 108 would output a digital sample without using the A/D converter. The processor 916 then determines whether the sample level corresponds to the signal level range of bin 0, in decision block 1104. If the sample level corresponds to the range for bin 0, the processor increments the count in bin 0, as indicated in block 1106.

If the sample was not determined to be in bin 0 in decision block 1104 (FIG. 12), or following an increment of bin 0 in block 1106, the processor 916 determines whether the input sample exceeds the noise threshold x (FIGS. 4 and 5), as indicated in decision block 1108. If the input sample exceeds the threshold x, the processor starts the speech holdover timer and generates a speech present signal, as indicated in block 1110. The holdover timer may be a 5 second timer. During the five seconds, the state of the detector will not change. This insures that the detector will not toggle between a speech present and no speech present condition because of short pauses in speech.

The processor 916 then determines whether the sample count is greater than 128, as indicated in decision block 1112. If the sample count is not greater than 128, the processor returns to block 1102 to input another sample. If the sample count is greater than 128, the processor 916 loads a new threshold from a table based on the current bin 0 value, as indicated in block 1114. The processor 916 then clears the sample count and divides the bin 0 count by 2 as indicated in block 1116. Alternatively, the bin 0 count could be cleared. The advantage of dividing the previous bin 0 count by two is the histogram will retain information about past thresholds. If the bin is cleared each time the sample count reaches the predetermined number of samples, the bin will always be based on a current background noise level.

The processor 916 then determines whether the speech holdover timer is expired, as indicated in decision block 1122. If the holdover speech timer has not expired, the processor returns to input the next sample, as block 1102. If the holdover timer has expired, the processor detects that speech is present, as indicated in block 1120.

The processor 916 thus sets the threshold after 128 samples are input thereto. The threshold is selected from a table, which may be a ROM having predetermined sample count to threshold level relationships. The threshold is inversely proportional to the count in bin 0. A large bin 0 count, indicating a lot of samples having a low level, will result in a low threshold. Conversely, if the bin 0 value is low, indicating the background noise is high, the threshold will be higher.

Accordingly, it can be seen that a method and apparatus for speech presence detection is disclosed that detects changing background noise levels without external analog filters or complex, time consuming digital IIR or FIR filters. Further, the circuit detects the presence of speech reliably using an empirically derived table. Replacing old samples with new samples after a predetermined maximum number of samples are represented by the histogram facilitates more dynamic monitoring of the noise threshold level. Speech can be detected by noting slow shifts in the shape of the rectangle. Using only the bin 0 counts further reduces the memory requirements and processor resources which must be dedicated to speech presence detector.

The immediate invention allows the processor to use a random control signal. The random control signal will either have random time intervals between each pulse for controlling sampling, or it will have random enabling of a signal generator producing signals with uniform intervals between each pulse. This allows a processor primarily dedicated to other functions to perform speech presence detection during otherwise inactive periods, thereby eliminating the need for a dedicated speech presence detector processor.

It will be recognized that those processors that go into an inactive state, or rest state, when predetermined conditions are met, do so at random intervals in such radio telephone systems. Thus, even if the control signal has a fixed frequency while being generated, the average sampling frequency of the control signal will be random due to the nonuniform time periods between which, and during which, the processor enters the rest state.

The novel system facilitates speech detection in a noisy environment without extensive analog parts or severe number crunching processes. Additionally, although the processes are illustrated in a cordless telephone, it will also find application in any circuit utilized with audio signals.

What is claimed is:

1. A speech presence detector, comprising:
   a circuit input to couple to a source of input signals;
   a signal generator to generate a random control signal at a control signal output;
   a sampling circuit coupled to the circuit input to receive the input signals, the sampling circuit including a control input coupled to the control signal output to receive the random control signal and generating samples corresponding to the input signals as a function of the random control signal; and a processor coupled to the sampling circuit to receive the samples, the processor responsive to the samples to identify a background noise threshold and the processor detecting presence of a speech signal in the input signals when the input signals exceed the background noise threshold.

2. The speech presence detector as defined in claim 1, wherein the processor compares instantaneous samples output by the sampling circuit to the background noise threshold to detect the presence of the speech signal.

3. The speech presence detector as defined in claim 1, further including an audio transducer, wherein the circuit input is coupled to the audio transducer and the random control signal has an average frequency that is within a frequency range of a human speech signal.

4. The speech presence detector as defined in claim 3, wherein the average frequency of the random control signal is less than 1000 Hz.

5. The speech presence detector as defined in claim 3, wherein the processor includes a bin associated with a predetermined amplitude range of input signals, the bin storing a value that is a count of samples having an amplitude in the predetermined range of the input signals.

6. The speech presence detector as defined in claim 5, further including a conditioning circuit generating digital representations corresponding to the input signals.

7. The speech presence detector as defined in claim 6, wherein a plurality of bins are used to generate a histogram, and wherein each of said bins is a count representing a number of samples in a respective predetermined range.

8. The speech presence detector as defined in claim 7, wherein the number of samples used to generate the background noise threshold is limited to a predetermined number.

9. The speech presence detector as defined in claim 8, wherein the conditioning circuit includes an A/D converter, and the sampling circuit is coupled to the A/D converter.

10. The speech presence detector as defined in claim 9, wherein the processor includes a bin associated with a subset of output levels of the A/D converter, and the background noise threshold is set by the count in the bin.

11. The speech presence detector as defined in claim 10, wherein the count of the bin associated with lowest amplitude signal samples is the only bin count used by the processor to determine a speech signal threshold.

12. The speech presence detector as defined in claim 10, wherein said bin count is the zeroth bin.

13. The speech presence detector as defined in claim 1, wherein the control signal has a constant frequency and the signal generator is randomly enabled to generate the control signal and disabled to stop generation of the control signal.

14. An audio circuit comprising:

a microphone for converting audible signals to input signals;

a signal generator generating a control;

a sampling circuit coupled to the microphone and to the signal generator, the sampling circuit sampling the input signals as a function of the control signal and outputting a sample signal responsive thereto;

a processor coupled to the sampling circuit to receive the sample signal and responsive thereto to identify a background noise threshold, the processor identifying the presence of a speech signal in the input signals when the input signals exceed the background noise threshold; and an A/D converter converting the input signals to digital representations, the A/D converter having output levels, and the sampling circuit being coupled to an output of the A/D;

wherein the processor includes a predetermined bin storing a value representing a count of the number of samples having an amplitude in a predetermined subset of the output levels of the A/D converter, and the bin count in the predetermined bin is the only bin count used by the processor to generate the background noise threshold.

15. The audio circuit as defined in claim 14, wherein the predetermined bin is the zeroth bin.

16. A telephone comprising:

a microphone for inputting audio signals;

a transmitter including an A/D converter coupled to the microphone, the A/D converter to convert the audio signals into digital representations;

an antenna coupled to an output of the transmitter a controller generating a random control signal;

a sampling circuit coupled to the A/D converter to receive the digital representations and coupled to the controller to sample the digital representations according to the random control signal and generating signal samples; and a processor coupled to the sampling circuit, the processor counting signal samples within a predetermined amplitude range and identifying a background noise threshold from a count of random samples which are in the predetermined amplitude range, and the processor detecting a speech signal when the random samples exceed the background noise threshold, and the processor coupled to the transmitter to enable the transmitter to output signals to the antenna when the speech signal is detected and to disable the transmitter from outputting signals to the antenna a predetermined time after the speech signal is no longer present in the digital representations.

17. A method of detecting the beginning of speech in input signals to an audio circuit, the method comprising the steps of:

randomly sampling the input signals to produce samples;

generating a background noise threshold from the samples;

comparing the input signals to the background noise threshold; and detecting the beginning of speech when the input signals exceed the background noise threshold.

18. The method as defined in claim 17, further including:

counting a number of samples only in a predetermined amplitude range; and identifying a current speech threshold from the number of samples in said predetermined amplitude range.

19. The method as defined in claim 18, further including:

generating the current speech threshold on a periodic basis;

holding the current speech threshold until a new speech threshold is generated; and comparing the input signals with the current speech threshold until the new speech threshold is generated.

* * * * *